(12) United States Patent
Mullen et al.

(10) Patent No.: US 12,229,792 B1
(45) Date of Patent: Feb. 18, 2025

(54) SYSTEMS AND METHODS FOR MATCHING ONLINE SEARCHES TO IN-STORE PURCHASES

(75) Inventors: Jeffrey D. Mullen, Pittsburgh, PA (US); Philip W. Yen, Cupertino, CA (US)

(73) Assignee: Dynamics Inc., Cheswick, PA (US)

( * ) Notice: Subject to any disclaimer, the term of this patent is extended or adjusted under 35 U.S.C. 154(b) by 222 days.

(21) Appl. No.: 13/006,610

(22) Filed: Jan. 14, 2011

Related U.S. Application Data (60) Provisional application No. 61/294,888, filed on Jan. 14, 2010.

(51) Int. Cl.
 *G06Q 30/0207* (2023.01)
 *G06Q 30/0238* (2023.01)

(52) U.S. Cl.
 CPC ..... *G06Q 30/0222* (2013.01); *G06Q 30/0238* (2013.01); *G06Q 30/0239* (2013.01)

(58) Field of Classification Search
 CPC ..... G06N 3/08; G06N 3/0454; G06Q 30/0283
 USPC .............................. 705/14.1–14.73
 See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

Xiaoping Wang, Zhehong Tang and Hui Luo, "A new mobile Internet search engine-based advertising method and theory," 2006 8th International Conference Advanced Communication Technology, 2006, pp. 4 pp.-46, doi: 10.1109/ICACT.2006.205915.*

(Continued)

*Primary Examiner* — Allan J Woodworth, II
(74) *Attorney, Agent, or Firm* — Morris Law Group; Robert W. Morris (57) ABSTRACT

Advanced payment applications are provided to improve the functionality of cards and devices. For example, a user interface may be placed on a card (e.g., a physical button) or a telephonic device (e.g., a virtual button on a capacitive touch screen). A code may be manually or wirelessly communicated to a card. The code may be presented on a search results page of a web search. The code may then be communicated to a card reader, such as a magnetic stripe reader. In doing so, a merchant may determine what online search results resulted in an in-store sale.

17 Claims, 9 Drawing Sheets

(56) References Cited

U.S. PATENT DOCUMENTS

| | | |
|---|---|---|
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,594,493 A * | 1/1997 | Nemirofsky ....... H04N 21/4722 348/E5.103 |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 * | 10/2003 | Blossom .......... G06K 19/07703 235/492 |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Graham et al. |
| 7,660,902 B2 | 2/2010 | Graham et al. |
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0057268 A1 * | 5/2002 | Saib et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 * | 8/2002 | Keresman et al. |
| 2003/0011868 A1 * | 1/2003 | Zehner et al. |
| 2003/0034388 A1 | 2/2003 | Routhenstein et al. |
| 2003/0052168 A1 | 3/2003 | Wong |
| 2003/0053762 A1 * | 3/2003 | Cheng et al. |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0171096 A1 * | 9/2003 | Ilan ....................... G06Q 30/02 348/E7.054 |
| 2003/0173409 A1 | 9/2003 | Vogt et al. |
| 2003/0178487 A1 * | 9/2003 | Rogers |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |

(56) References Cited

U.S. PATENT DOCUMENTS

| | | |
|---|---|---|
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0138270 A1* | 6/2007 | Reblin .................. G06Q 20/208 235/383 |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0140520 A1* | 6/2008 | Hyder ................ G06Q 30/0207 705/14.1 |
| 2008/0148394 A1 | 6/2008 | Poidomani et al. |
| 2008/0167991 A1* | 7/2008 | Carlson .............. G06Q 30/0215 705/50 |
| 2008/0195476 A1* | 8/2008 | Marchese ........... G06Q 10/087 705/28 |
| 2008/0201264 A1 | 8/2008 | Brown et al. |
| 2008/0209550 A1 | 8/2008 | Di Iorio |
| 2008/0281714 A1* | 11/2008 | Kluth .................... G06Q 30/02 705/26.1 |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0231411 A1* | 9/2009 | Yan |
| 2009/0242648 A1 | 10/2009 | Di Sirio et al. |
| 2009/0244858 A1 | 10/2009 | Di Sirio et al. |
| 2009/0248633 A1* | 10/2009 | Ojakaar ................ G06Q 30/02 |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0179857 A1* | 7/2010 | Kalaboukis .......... G06Q 20/208 705/26.1 |
| 2011/0028184 A1 | 2/2011 | Cooper |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/594,300, Poidomani et al.
U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Nos. http://homes.cerias.purdue.edu/~jtli/paper/fc07.pdf. As viewed on Apr. 12, 2010.
English translation of JP 05210770 A.

* cited by examiner

SYSTEMS AND METHODS FOR MATCHING ONLINE SEARCHES TO IN-STORE PURCHASES

CROSS-REFERENCE TO RELATED APPLICATION

This application claims the benefit of U.S. Provisional Patent Application No. 61/294,888, titled "SYSTEMS AND METHODS FOR MATCHING ONLINE SEARCHES TO IN-STORE PURCHASES," filed Jan. 14, 2010, which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a merchant code or incentive code. The code may be received by the card via manual input (e.g., onto buttons of the card) or via a wireless transmission (e.g., via light, electromagnetic communications, sound, or other wireless signals). A code may be communicated from a webpage (e.g., via light and/or sound). A card may include a display such that a received code may be visually displayed to a user. In doing so, the user may be provided with a way to select, and use, the code. Accordingly, a search engine may provide search results that include incentives. A user may transfer those incentives onto his/her card (or other mobile device). In doing so, an online search provider may be able to measure when a search has resulted in an in-store sale. Accordingly, the search provider may charge the merchant a different fee (e.g., an additional fee or a higher fee) for a search that results in an in-store purchase versus a search that results in an online purchase.

A search engine may be utilized by a user, for example, to search for merchandise and merchandise deals. A merchant may sign up with a search provider such that the merchant may include its websites and/or merchandise in the search. A merchant may pay additional fees to list the merchant's websites and/or merchandise in a variety of ways. For example, a merchant may pay additional fees to list the merchant's website at the top of a search results page. A user may thus utilize a search engine to see various desired merchandise and promotions from a merchant. A user may download a merchant promotion to his/her card (or other mobile device) and use that promotion in the future. The promotion may include, for example, a percentage discount, a fixed-amount discount, a non-cash consideration (e.g., a free hat), or any other incentive. The incentive may have an expiration date. The incentive may have a requirement in order to earn the incentive. For example, the incentive may be $10 off a $50 purchase (thus requiring the user to spend $50 to receive the $10 incentive).

An inventive code may take various forms. The code may include information such that a remote processing system may identify the merchant, the search provider, the incentive, and the user that performed the search. The incentive code may include information such that a remote processing system may identify the merchant, the search provider, the incentive, but not the user. For example, a transmitted code may take the form of "WALMART10." A remote system may receive WALMART10 and determine that WALMART10 is indicative of 10% off a purchase for an in-store Walmart purchase and was issued by a particular search provider (e.g., search provider X). The remote system may receive WALMART10B and determine that WALMART10B is indicative of 10% off a purchase for an in-store Walmart purchase and was issued by a different, particular search provider (e.g., search provider Y). The system may also determine that the code may have an expiration date and that any user can utilize the code anytime before the expiration date. Incentive use codes may be unique to a particular user. In doing so, a unique incentive code may be utilized once (or a set number of times). A remote processing system may, for example, receive an incentive code and a payment card number (e.g., a credit card number). Accordingly, incentive use codes may be associated to a payment card number when received by a remote processing system. Accordingly, a remote processing system may keep track of the number of times a particular card used an incentive. In doing so, a generic code may be transmitted to a card, but a limitation on the use of the code may be placed on a user by the remote processing system.

A code may be generated by an algorithm by the search provider. The code may be generated from, for example, information sent to the search provider from the merchant. The code may include security information such that the card (or other mobile device) or remote processing system may recognize that the code is authentic. The code may then be passed back to the search provider and/or merchant when the code is communicated in a payment transaction. The code may be communicated in an online transaction by having the user enter the code in during an online transaction. For example, a display may be provided on the card and the code may be displayed on the display. The code may take the form of a three or four digit code and may be entered as an online security code in an online security code entry box for an online transaction. The code may also be communicated via an RFID, dynamic magnetic stripe communications device, and/or an exposed IC chip (e.g., EMV chip). For example, a code may be communicated in track 1 magnetic stripe data and track 2 magnetic stripe data that is communicated from a dynamic magnetic stripe communications device to a magnetic stripe reader.

Codes may be communicated from any website (e.g., a merchant website or a search results page from a search engine). The code may be communicated from a display or a mobile telephonic device. The code may be communicated, for example, via light pulses communicated from the displayed website that are indicative of information. The card, or other device (e.g., a mobile telephonic device), may utilize the received light pulses to determine communicated information. The codes may be indicative of incentives. Such incentives may also be communicated in emails or other messages. Such incentives may be communicated at a merchant site after an online purchase has been paid as part of an online receipt (e.g., $10 off your next in-store purchase as a reward for your online purchase). Indicia may be provided on the website or GUI communicating the light pulses so that a user may properly align his/her card (or other mobile device) to the website or GUI. The card may acknowledge receipt of a code via a visual indication (e.g., an LED performing a particular action such as blinking a particular color), an audible indication (e.g., a beep), or any other type of indication (e.g., a vibration). The website or GUI may provide a confirmation button for the user to press to confirm the code has been transferred. In doing so, for example, a merchant may pay a service provider one fee for a code transfer and a second fee for a code being utilized in a payment transaction.

Payment information may be received by a card reader that includes an incentive code obtained from an online search. This information may be routed to any number of facilities. For example, this information may be parsed and replicated such that the payment card number and incentive code is communicated to both the card issuer and search provider. As per another example, the received information may be parsed and new information generated such that the payment card number and incentive code is communicated to the card issuer and a unique identification number, associated with a payment card number, and the incentive code is communicated to the search provider and/or merchant.

The received payment data may be sent to a matching and settlement provider with transaction data identifying the merchant and the transaction details and any additional data such as additional consumer marketing type data (e.g., demographics, elite level, prior purchase history). The matching and settlement provider may, for example, decode a received message to derive the merchant, discount offered, expiration, and any other original data associated with the code. The matching and settlement provider may, for example, check that the offer redeemed is valid, the merchant is correct, and that the offer has not expired or exceeded a redemption limit. The matching and settlement provider may determine, for example, if the redeemed offer is valid, the amount of discount to be given to the consumer, and may communicate this amount of discount to the card servicing party (e.g., card issuer or merchant).

The merchant may be, for example, the card servicing party. Accordingly, the merchant may elect to give an instant discount (e.g., taken off the payment) at the point-of-sale. If the card servicing party is a card issuer, for example, the card issuer may elect to apply a statement credit to the consumer account at transaction posting or statement generation time.

The matching and settlement provider may, for example, perform settlement with the entities that had participated in the transaction. The matching and settlement provider may, for example, calculate the amount the merchant will pay to the search provider (or other provider) via the matching and settlement provider, the amount the merchant will pay to the card (or device) provider via the matching and settlement provider. The payment may include a loyalty interchange based on rules set by the matching and settlement provider for participation in the matching and settlement provider's system and/or a marketing data fee defined by the matching and settlement provider indicative of the value of marketing data an entity (e.g., a card issuer) provides another issuer (e.g., the merchant) about the consumer.

The merchant may be required, for example, to pay the matching and settlement provider for marketing data extracted by the matching and settlement provider from the purchase history of multiple card issuers that is sent to the merchant as well as all contributing card issuers on a real-time or batch basis. The matching and settlement provider may determine this amount.

The matching and settlement provider may determine an amount the merchant or card issuer (or device issuer) may pay a download provider via the matching and service provider. The download provider may, for example, provide and manage the downloading of incentives to a card, or other device. Any messages sent to a magnetic stripe reader may also be downloaded to a card, via a mobile device, via the download provider. The download provider may provide, for example, code that a website may utilize to place download indicia controlled by the download provider at the direction of the consumer. Accordingly, a merchant's website may include a button that a user may click on to start a download of information to a card from a remote server operated by the download provider. The transfer of information may occur, for example, via pulses of light. The card, or other device, may include light receivers to receive the light pulses and processing to determine the data represented by the light pulses.

A search engine or merchant website may display codes, for example, that may be manually entered into a card or other device (e.g., via buttons). Such manual codes may be representative of various promotions.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
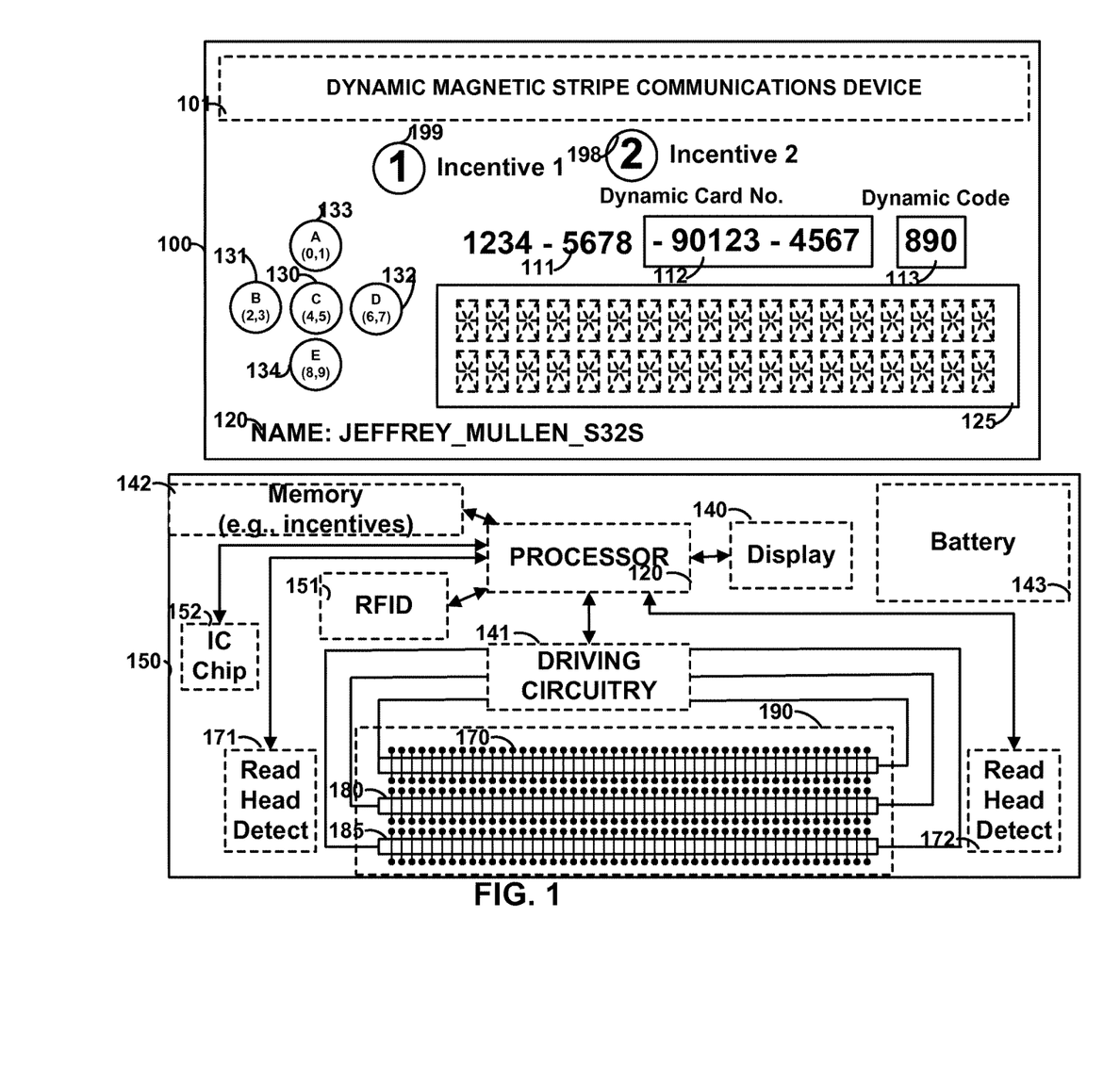
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination of mechanical and capacitive buttons. Card 100 may include button 199. Button 199 may be used, for example, to communicate information through dynamic magnetic stripe communications device 101 indicative of a user's desire to pay for an item on credit, but to debit the credit account for the amount from a user's bank account when the next credit statement posts (or the subsequent credit statement posts and the associated bill is due). Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a promotion obtained as part of the search results of a web search. Multiple buttons may be provided on a card and each button may be associated with a different promotion. For example, a user may perform a search for a product using a search engine. The search results may include numerous merchants. A few of these merchants may provide with the search results promotions that may be loaded onto a card (e.g., manually or wirelessly) and associated with a particular button.

Architecture 150 may be utilized with any card. Architecture 150 may include processor 120 and battery 143. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may store discretionary data codes associated with buttons of card 150. Such codes may be recognized by remote servers to effect particular actions. For example, a code may be stored on memory 142 that causes a promotion to be implemented by a remote server (e.g., a remote server coupled to a card issuer's website). Memory 142 may store types of promotions that a user may have downloaded to the device and selected on the device for use. Each promotion may be associated with a button. Or, for example, a user may scroll through a list of promotions on a display on the front of the card (e.g., using buttons to scroll through the list).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device (e.g., magnetic stripe communication device 190) may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
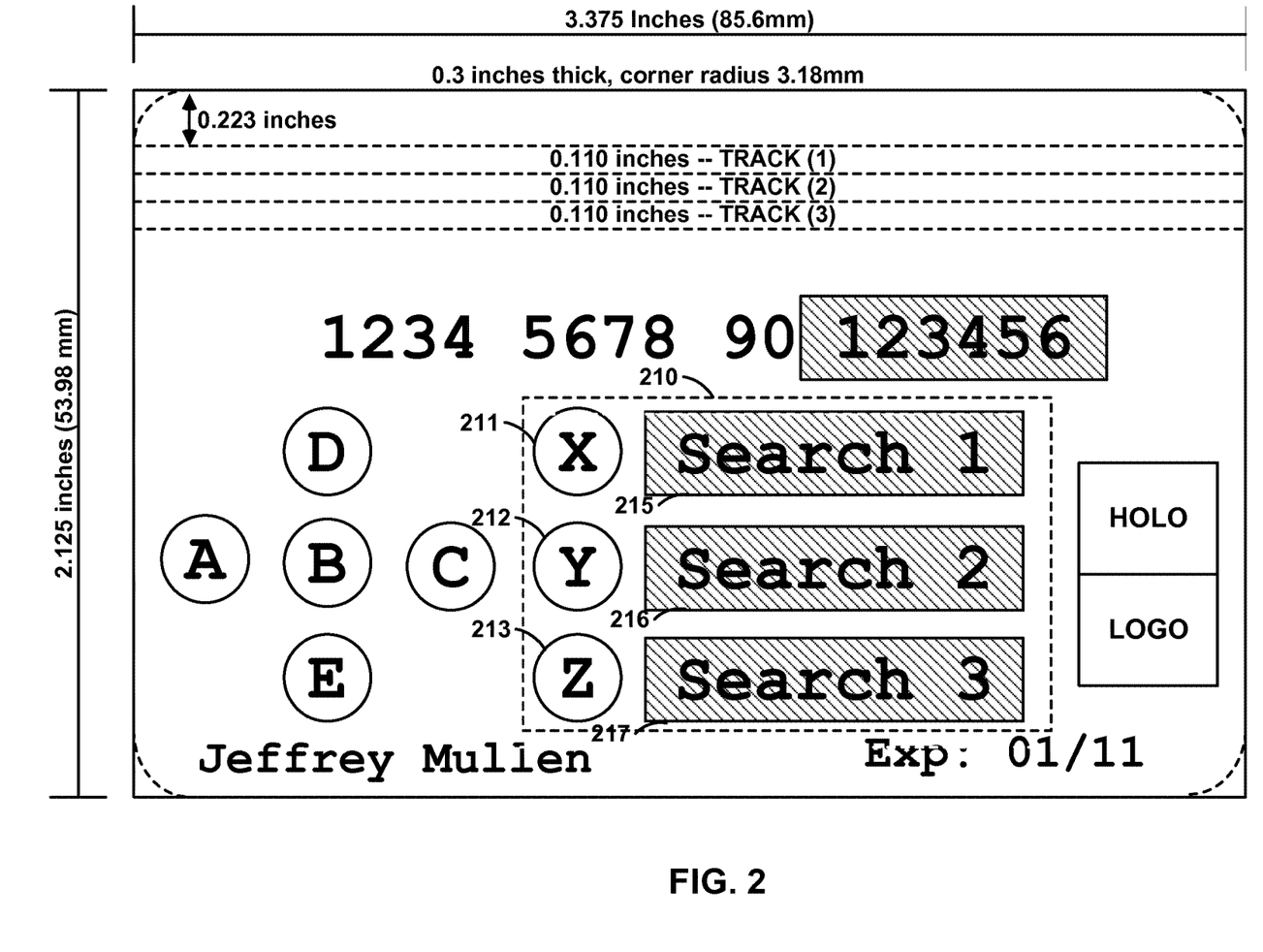
FIG. 2 is an illustration of a card constructed in accordance with the principles of the present invention.

FIG. 2 shows card 200 that includes button 211 associated with display 215, button 212 associated with display 216, and button 213 associated with display 217. Each button may be associated with a feature displayed in a display. A user may press a button in order to communicate data representative of the feature through a magnetic stripe communications device or other communications device (e.g., RFID or IC chip). A light emitting diode (or other source of light) may be associated with each button to indicate to a user what feature was selected by a user. A user may be able to select multiple features such that multiple feature codes are communicated in tracks of magnetic stripe data communicated by a magnetic stripe communications device. Such codes may be provided in discretionary data fields. Such codes may be repeated on each track of communicated magnetic stripe data (e.g., repeated on tracks 1 and 2 or repeated on tracks 1, 2, and 3). In doing so, a user may associate multiple features to a purchase. A user may apply a promotion obtained from a search, for example, by pressing button 211 for a purchase transaction. A user may press button 212 to apply a different promotion obtained from, for example, a different search. Button 213 may apply yet another promotion obtained from, for example, another search. Any combination of buttons and displays, for example, may be provided in area 210.

The features associated with each card may be predetermined by a user. For example, a user may select features to place on a card when ordering a card. Additionally, a user may go to a card issuer's website and select attributes of features. For example, a user may visit a card issuer's website and select the particular offering that is to be purchased whenever a user selects the feature associated with button 211 and displayed on display 215. Information associated with a button may be displayed via a display or permanently printed, embossed, or laser engraved on a card. Card 200 may include a light sensing device to receive information via light pulses from a display (e.g., a television, mobile phone, or laptop display). A user may select to change the features or attributes of features from a card issuer's website and may reconfigure a card accordingly. Alternatively, a card may be provided with buttons and no descriptive information. A user may change the features or attributes of features associated with one or more buttons via a card issuer's website and remote processing may perform the associated processing as a result of on-card button selections. Different codes may be communicated depending on the features or attributes of features on a card. Such codes may be changed via a wireless communications signal (e.g., a light-based communications signal). In doing so, processing may occur off-card at a remote server without the need to determine what feature a user associated with a code. Persons skilled in the art will appreciate that a card issuer may monitor the frequency and number of times that a user utilizes a particular feature. Additionally, the card may receive wireless communications signals (e.g., WiFi signals) associated with the modifications and additions).

Figure 3:
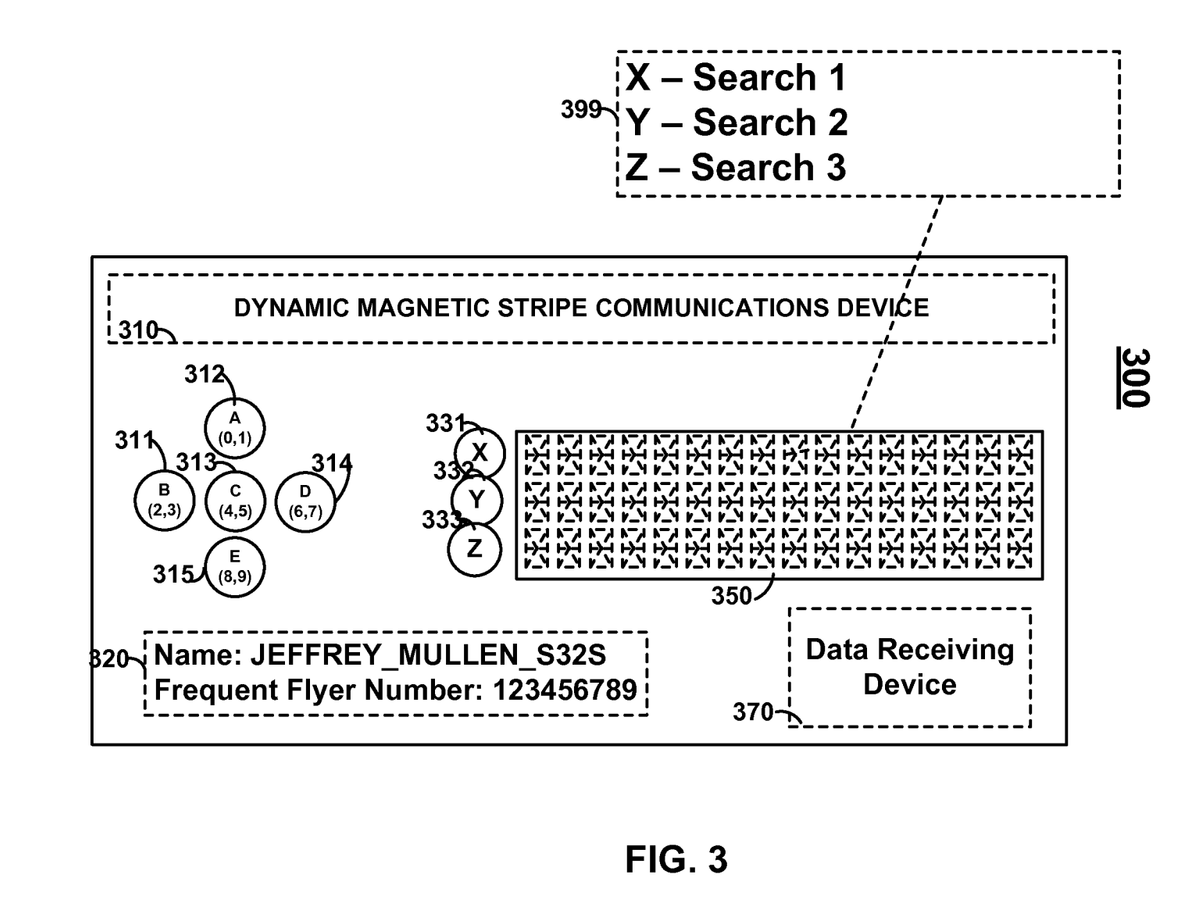
FIG. 3 is an illustration of a card constructed in accordance with the principles of the present invention.

FIG. 3 shows card 300 that may include dynamic magnetic stripe communications device 310, buttons 311-315, permanent information 320, display 350, data receiving device 370, and buttons 331-333. Button 331 may be associated with a first line of displayed information on display 350. Button 332 may be associated with a second line of displayed information on display 350. Button 333 may be associated with a third line of displayed information on display 350. Persons skilled in the art will appreciate that buttons 331-333 may actually be virtual buttons on display 350 and display 350 may be a capacitive touch screen. Data receiving device 370 may be a light or sound sensor for receiving information through received light or sound. Portion 399 may be displayed on display 350. The first line of portion 399 may be associated with button 331 and may, for example, cause a code to be communicated (e.g., with magnetic stripe data for authorizing a purchase transaction) to a magnetic stripe reader that is associated with a promotion or incentive. Persons skilled in the art will appreciate that search results may include merchant promotions next to the search results for a particular merchant. In doing so, the search provider may obtain information about what online searches result in an in-store sale. As a result, search providers may charge an additional fee for online searches that generate in-store sales. The second line of portion 399 may be associated with, for example, button 332 of display 350 and may be a different promotion or incentive. The third line of portion 399 may be utilized for a user to select yet another promotion or incentive.

Figure 4:
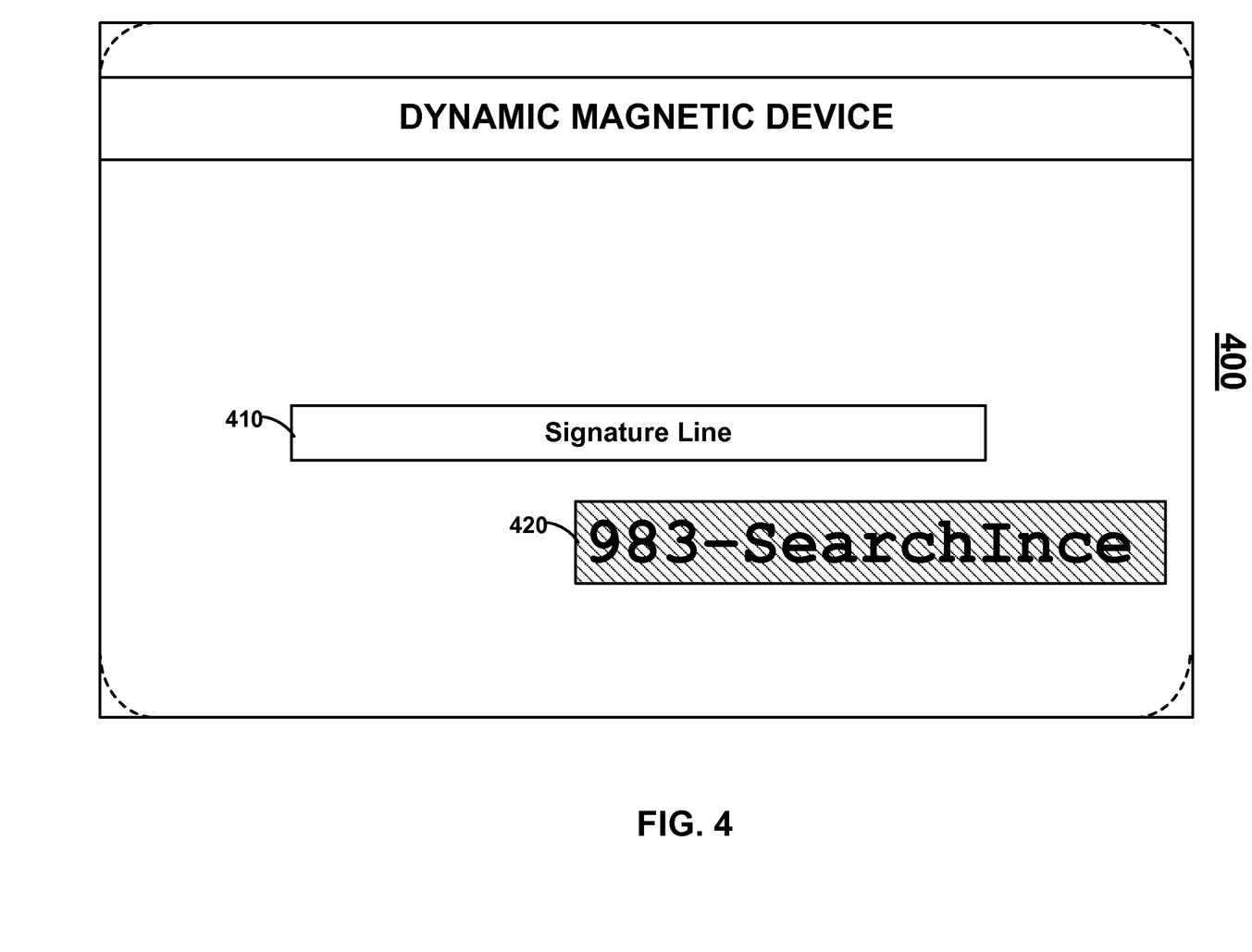
FIG. 4 is an illustration of a card constructed in accordance with the principles of the present invention.

FIG. 4 shows card 400 that may include signature line 410 and display 420. Persons skilled in the art will appreciate that card 300 of FIG. 3 may depict the obverse side of a card and card 400 of FIG. 4 may depict the reverse side of a card. Individual components of card 300 of FIG. 3 or card 400 of FIG. 4 may be provided on either side of a card or both sides of a card. More than one instance of a component may be provided on any side of a card (e.g., the same side as a component or a different side as a component). Persons skilled in the art will appreciate that a user may communicate feature codes representative of a user's on-card selection via codes that may be displayed visually and entered into a webpage as part of an online payment. A display (e.g., display 420) may display not only a code for an online payment, but also indicia representative of the feature. In doing so, the user can confirm that the right feature was selected. Persons skilled in the art will appreciate that different codes for the same feature may be displayed and communicated via a dynamic magnetic communications device. In doing so, the security of the card may be increased. Additionally, the same or different codes may be communicated on different tracks of data to represent the selection of a particular feature. A code may be utilized, for example, to communicate information about an installment plan a user desires to initiate for a purchase. Display 420 may include, for example, a promotion or invoice obtained from a merchant website or a search engine results page.

Figure 5:
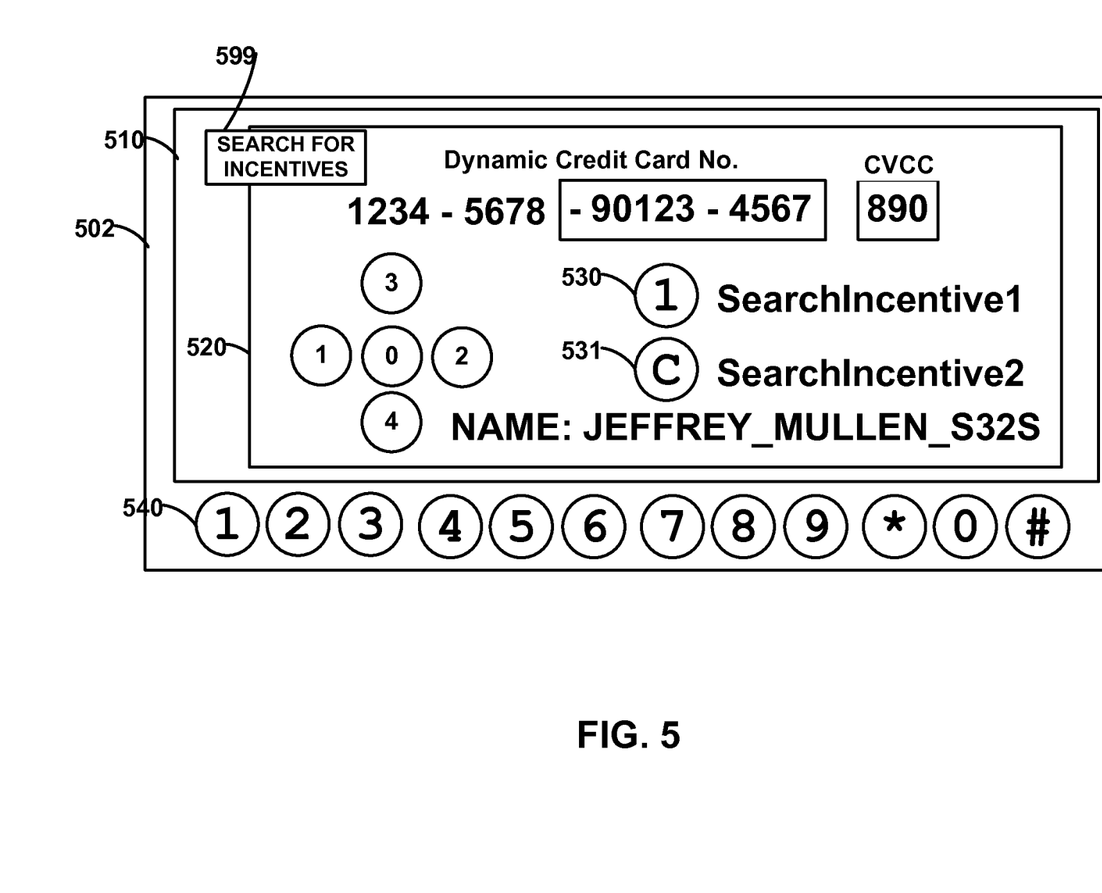
FIG. 5 is an illustration of a mobile device constructed in accordance with the principles of the present invention.

FIG. 5 shows mobile device 500, which may be, for example, a mobile telephonic device. Device 500 may include one or more physical buttons (e.g., button 540). Device 500 may include one or more display screens 510. Such a display screen may be touch sensitive such that virtual buttons (e.g., button 530 may be provided) on virtual card 520. Virtual card 520 may appear similar to a physical card described herein. A user may select different virtual cards by, for example, swiping his/her finger across a touch-sensitive display to scroll to the next virtual card. Mobile phone 502 may include a communications device operable to communicate data to a card reader. For example, mobile phone 502 may include an RFID antenna to communicate to an RFID reader, a pop-out IC chip panel operable to be fed into an IC chip reader, or a magnetic communications device having a magnetic emulator operable to communicate magnetic stripe data wirelessly to a read-head of a magnetic stripe reader. Virtual button 530 may be provided to indicate a user's desire for a regular pay option for a purchase. Virtual button 531 may be provided to indicate a user's desire for an installment pay option for a purchase.

Figure 6:
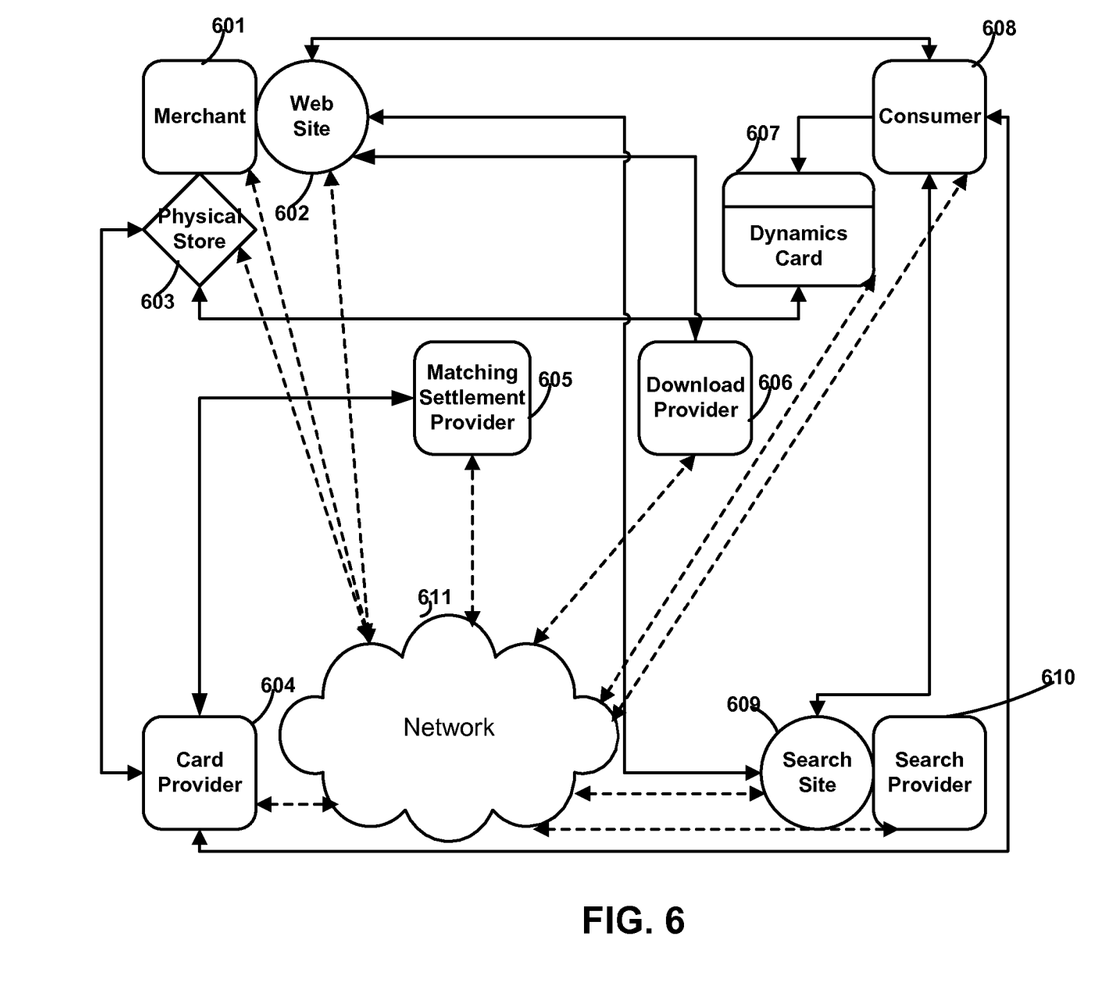
FIG. 6 is an illustration of a network topology constructed in accordance with the principles of the present invention.

FIG. 6 shows network topology 600 that may include, for example, network 611, merchant facility 601, merchant physical store 603, merchant website 602, consumer 608, interactive powered card or device 607, download provider 606, matching settlement provider 605, card provider 604, search provider 610, and search site 609. Persons skilled in the art will appreciate that additional objects may be included in network topology 600 and that any object in network topology 600 may communicate to any other object in network topology 600. Objects in merchant network topology 600 may also be provided at the same facility by the same entity. For example, matching and settlement provider 605 may be performed by card provider 604.

A consumer may use a site, such as the site of a search provider or a site that includes a search engine from a search provider, to look for information such as merchandise or deals. A search provider may sign up merchants to advertise on its online or mobile website. Such advertisements may include, for example, a link to the website of a merchant. A search provider and/or merchant may entice a consumer to use the search provider to search for merchandise. The search provider may give participating merchant(s) priority display on search results or direct messaging opportunity on search pages in exchange for value from merchant(s).

When a consumer sees merchandise or a promotion from a merchant that he or she likes, the consumer may, for example, either access the merchant's web site by clicking on the search result (e.g., the search link) or react to an advertised promotion displayed by the merchant on the search provider's site (e.g., or site hosting the search engine). In either case, for example, the consumer may be offered the opportunity to download a financial incentive (e.g., a discount), on to a card or other device from the card provider. The card provider may be, for example, a payment card issuer such as a credit card issuer and/or a bank. A code may be offered indicative of the incentive that may be entered into the card or other device. A wireless communication can occur to provide the financial incentive to the card or other device.

A consumer may elect, for example, to accept an offer to download a financial incentive (e.g., a promotion for a discount). An originating entity (merchant or search provider) may, for example, contact the download provider to initiate the download process. The originating party may include, in its request to the download provider, for example, information such as merchant and/or search provider identification, merchandise, discount, one-time or no limit, expiration, and/or other data that may be needed later to link the discount offer back to the correct merchant, its specific offer, and/or the search provider that generated the lead.

The search provider may, for example, use the data sent to the search provider by the merchant or search provider to generate a code using an algorithm that, for example, uniquely identifies the offer that the consumer has requested. The code may also contain secret data to enable communication with a card or other device so that the card may accept the download. The code may then be passed back to the originating party (e.g., merchant or search provider).

A party, such as the originating party (e.g., merchant or search provider), for example, may display a message in a promotion offer to instruct the consumer to place his or her card, or other device, next to a designated spot on a consumer's computer screen or a mobile telephonic device. Data may be then transferred from this designated spot to the card, or other device, via a wireless information transfer technique (e.g., via light pulses provided via a light generation algorithm). The consumer may receive an indication that the download has completed on a card, or other device. For example, a source of light on the card, or other device, may be operated in a manner to indicate a download has completed. As per another example, a display on the card, or other device, may display information indicative that the download has completed. The consumer may be asked to confirm to a party, such as the originating party (e.g., merchant or search provider), for example, that the consumer has witnessed the completion of the download. Such a confirmation may, for example, be sent by the consumer through clicking on a "download confirmed" button on a card or other device or a virtual button on a screen of a card or other device. For example, a consumer may click a virtual button on or near the download area from the consumers personal computer or mobile telephonic device. If the download was not successful, the consumer may be asked to repeat the download process. Accordingly, for example, a mobile telephonic phone, personal computer, card, or other device, may be able to receive manual input (e.g., via a capacitive touch screen, keyboard, mouse, or other manual interface) indicative that a download is desired to be initiated again by a consumer for a card or other device. An entity, such as a download provider, may keep a record of the download for future reconciliation and customer service purposes. This record may be provided to other entities.

When the consumer shops at the merchant's physical store, for example, the consumer may, for example, elect to redeem the promotion to be used for a particular purchase. If the consumer has multiple offers on his/her card, or other device, he may select, for example, a particular offer by pressing button(s) or entering manual input into a card, or other device, and viewing displayed messages on the card, or other device, a promotion (e.g., a promotion associated with the desired merchant). When the consumer pays at the point of sale using the card, or other device, with a selected promotion, for example, the corresponding downloaded data may be sent to the card provider in the standard payment authorization message. Alternatively, for example, if the merchant is the card provider, then the downloaded data may be captured by the merchant (e.g., just by the merchant).

The downloaded data may be extracted by the card servicing party (e.g., card provider or merchant) and sent to a matching and settlement provider together with transaction data identifying the merchant and transaction details, and any consumer marketing type data (e.g. demographics, elite level, prior purchase history).

The matching and service provider may, for example, decode the message the provider received to derive information such as the merchant, discount offered, expiration and any other original data that was used to generate the downloaded code. The matching and service provider may, for example, check that the offer redeemed is valid (e.g., the merchant is correct, that the offer has not expired or exceeded redemption limit). The matching and service provider may, for example, if the redeemed offer is valid, send the amount of discount to be given to the consumer back to the card servicing party (e.g., card provider or merchant).

If the merchant is the card servicing party, for example, the merchant may elect to give an instant discount (e.g., taken off the payment) at the point-of-sale. If the card servicing party is a card provider, for example, the card provider may elect to apply a statement credit to the consumer account at transaction posting or statement generation time.

The matching and settlement provider may, for example, perform settlement with the entities that had participated in the transaction. As part of the services of the matching and settlement provider, for example, the matching and settlement provider may, among other things, calculate the amount the merchant will pay to the search provider via the matching and settlement provider. The amount the merchant may pay to the card provider via the matching and settlement provider may be provided in a variety of ways. The payment may be, for example, a loyalty interchange based on rules set by the matching and settlement provider to allow for participation in the system set up by the matching and settlement provider. The payment may be, for example, a marketing data fee which is defined by the matching and settlement provider and reflects the value any marketing data the card provider is willing to provide to a merchant about the consumer. The matching and settlement provider may determine the amount the merchant pays to the matching and settlement provider for any marketing data that is extracted by the matching and settlement provider from purchase history from multiple card providers which may be sent to the merchant as well as all contributing card providers on a real time or batch basis. The matching and settlement provider may determine the amount the merchant or card provider pays to the download provider via the matching and settlement provider.

Persons skilled in the art will appreciate that such promotions may directly link online advertising and actual in-store purchases, allowing merchants, search providers, and card providers to more effectively target advertising and to measure/pay for actual purchases resulting from advertising.

Persons skilled in the art will appreciate that a centralized download provider and matching and settlement provider may allow, for example, multiple participants to get the benefits provided by the system at a much lower cost and much broader base of consumer than what an individual entity can achieve by itself.

Persons skilled in the art will appreciate that the consumer may, for example, receive better targeted promotions from merchants (e.g., discounts associated with frequent purchases) and get generally better deals (e.g., larger discounts) over time. Persons skilled in the art will appreciate that merchants may pay for actual purchases resulting from advertising instead of paying for clicks to deliver better targeted advertising. Persons skilled in the art will appreciate that the search provider may be able to link search to actual purchases. The download provider may increase the use of downloads. The card provider may sell associated marketing data for a fee.

A downloaded data stream may include multiple parts. The first part of the downloaded data stream may, for example, be used by the card to send back information to the card provider when the downloaded promotion is redeemed at the POS. The data may be communicated from a card or device to a point-of-sale terminal in a number of ways (e.g., via a dynamic magnetic stripe communications device, IC chip, EMV, or a near-field communication). For example, a dynamic magnetic stripe communications device may be read at the POS, the first part of the data stream may be inserted into the discretionary data field of track 1 and track 2 data.

Magnetic stripe data may include a Personal Account Number (PAN). The PAN may be, for example, 16 digits or less. A name, for example, may be provided and may take up to 26 characters, including separators. Accordingly, for track 1, for example, 24 characters may be provided for discretionary data (e.g., as part of 79 alphanumeric characters). Three of the characters (e.g., of the discretionary data) may be reserved for a security code.

For track 2 magnetic stripe data, for example, 40 numeric digits may be provided and 3 digits within the discretionary field may be used for a security code.

The following format may use, for example, 10 numeric digits. Formats may be, for example, more or less than ten digits.

| Position | Field Name | Description and Comments |
|---|---|---|
| -4 | Merchant ID | An ID assigned by the matching and settlement provider to uniquely identify a merchant. This may provide, for example, up to 9999 merchant IDs. |
| -7 | Promotion type | Different values may be assigned to describe the type of promotion. For example: "001" = Discount of 5%, one-time only "011" = Discount of 5%, multiple use "002" = Discount of 10%, one-time only "012" = Discount of 10%, multiple use "003" = Discount of 15%, one-time only . . . etc. "101" = Discount of $5, one-time only "111" = Discount of $5, multiple use "102" = Discount of $10, one-time only "112" = Discount of $10, multiple use . . . etc. "119" = Discount of $100, one-time only "201" = Buy one, get one free (of equal or lesser value) "202" = Buy two, get one free . . . etc. "301" = No interest for 3 months "302" = No interest for 6 months . . . etc. |
| -10 | Expiration | MMY |

The second part of the downloaded data stream may be downloaded to a card or other device together with the above and may include one or more data fields. Such data fields may not be, for example, communicated to a card reader (e.g., simply stored in memory and utilized for various functions). Alternatively, for example, such data fields may be communicated to a card reader. The merchant name may be stored and used for display to a consumer when he wants to select a promotion for use from multiple promotions stored on a card. The Merchant Name may be tied to the Merchant ID (above). The merchant name may be abbreviated to have a maximum length (e.g., 8 or less than 8 characters). A merchant logo may also be downloaded, for example, in place or in addition to a merchant name. Alternatively, for example, a code may be a merchant name. A remote processing system may determine a particular promotion associated with a particular merchant at a particular time. The date of download may be downloaded and stored on a card (or other device) and may be utilized by the consumer to aid in selecting a promotion to be used for a purchase. An authentication code may be downloaded and stored and allow the card to check that the downloaded data is communicated from an authorized source.

Figure 7:
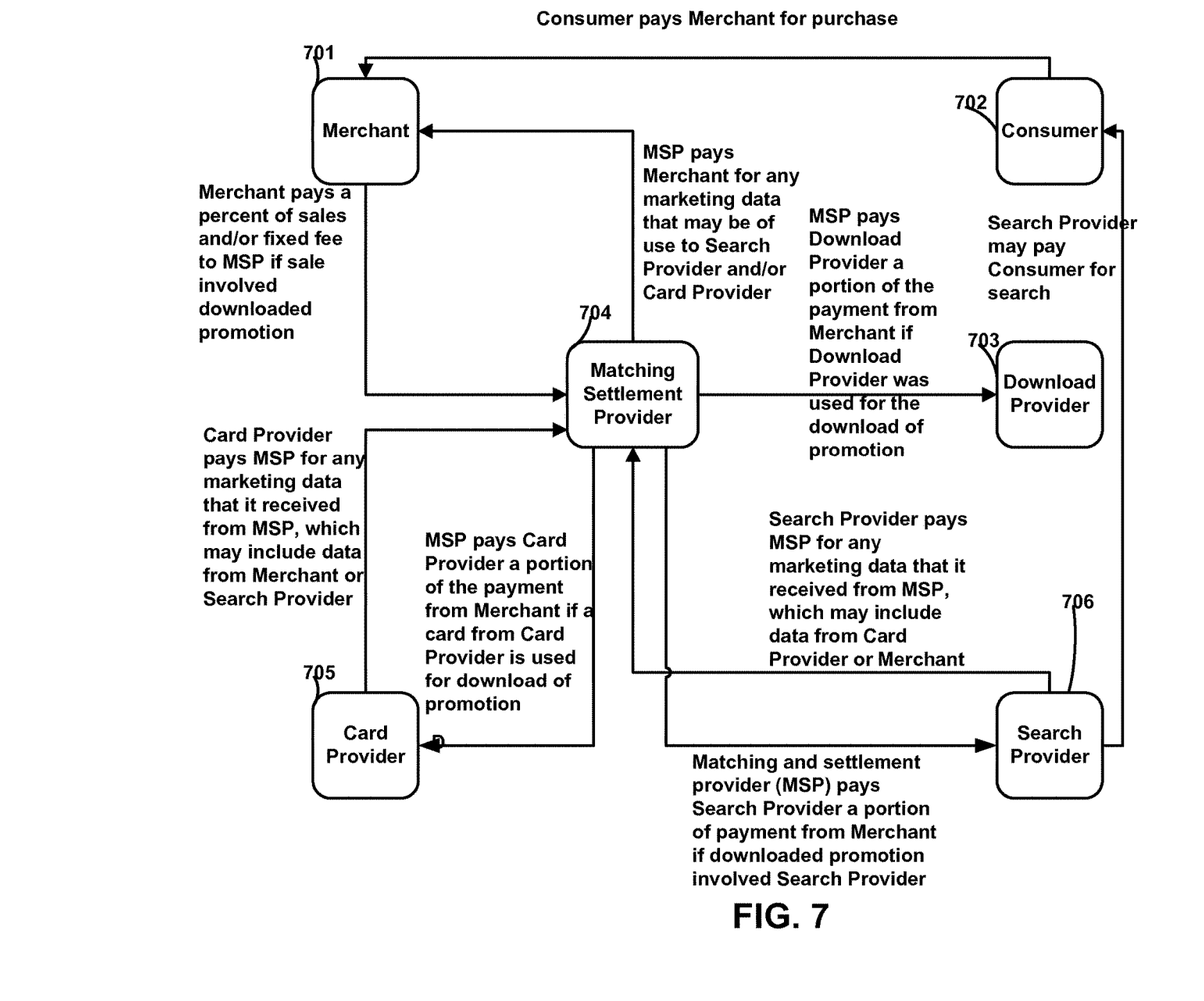
FIG. 7 is an illustration of a process flow chart constructed in accordance with the principles of the present invention.

FIG. 7 shows a process flow chart that may include merchant 701, consumer 702, download provider 703, matching and settlement provider 704, card provider 705, and search provider 706. A number of fees may be provided associated with various services and content. For example, a search provider may, for example, pay a consumer for a search. A matching and settlement provider may, for example, pay a download provider a portion of a payment from a merchant if the download provider was used for the download of the promotion. A search provider may, for example, pay a matching and settlement provider for marketing data that it received from the matching and settlement provider, which may include data from a card provider or merchant. A consumer may pay a merchant for a purchase. A matching and settlement provider may pay a search provider a portion of a payment from a merchant if a downloaded promotion involved a search provider. A matching and settlement provider may pay a merchant for marketing data that may be of use to the search provider and/or card provider. A matching and settlement provider may pay a card provider a portion of a payment from a merchant if a card from a card provider is used for download of the promotion. A merchant may pay a percent of sales and/or a fixed fee to a matching and settlement provider if a sale involved a downloaded promotion. A card provider may pay a matching and settlement provider for marketing data received from a matching and settlement provider, which may include data from a merchant or search provider.

Figure 8:
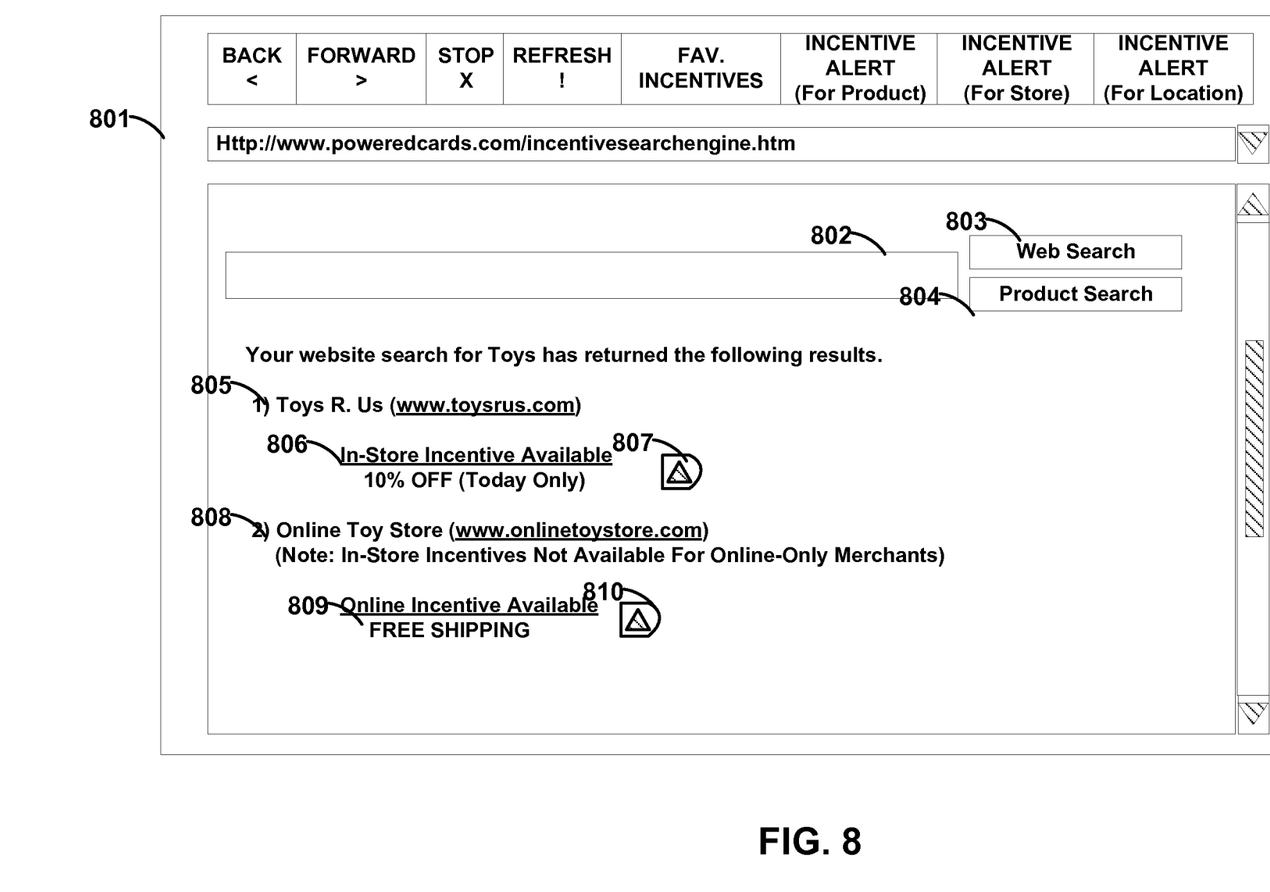
FIG. 8 is an illustration of a graphical user interface constructed in accordance with the principles of the present invention.

FIG. 8 shows a graphical user interface. GUI 801 is provided and may include search box 802, web search submission button 803, product search submission button 804, search results 805 and 808, promotion indicia 806 and 809, and light pulse generator indicia 807 and 810. Search indicia 806 may, for example, describe (e.g., textually) the incentive that may be transferred to a card (or other device). Indicia 806 may describe the amount of the incentive as well as the expiration of the incentive as well as whether the incentive is for online purchases, in-store purchases, or both. Codes may be communicated via an RFID, dynamic magnetic stripe communications device, or exposed IC chip to a card reader for in-store purchases. Codes may also be displayed on a display of a card (or other device) such that the incentives may be redeemed online (e.g., by entering the code into a security code field associated with a card) or in-store (e.g., via a cashier entering the code into a security code field associated with a card). The code may be displayed visually (e.g., via text) and entered into a card using an input interface of the card (e.g., an array of buttons). The code may be communicated wirelessly via, for example, cellular transmissions, optical transmissions, or audible transmissions. For example, a user may click on light pulse generator 807 and the generator may start generating pulses of light (e.g., blinking). A user may hold a card up to the light generator and the card may receive the light. The card may discern the information included in the light pulses and may process the data accordingly (e.g., save the code, associate it with a button, and display particular text on a display next to that button). Light generator 807 may repeatedly communicate an information packet until a user clicks the generator again to stop the generator or different indicia (e.g., a button that says "download confirmed") on GUI 801. The packet may include particular start bits and end bits such that a card can discern having received a complete data packet for processing. The card may ignore data received outside such start bits and end bits. GUI 801 may be part of, for example, a web browser or a GUI provided on a mobile device (e.g., a wireless telephonic device). Search result 808 may be included with indicia 809 representative of an online purchase incentive. Light generator 810 may be provided. Persons skilled in the art will appreciate that an online incentive may result in the display of a particular online code and an in-store incentive may result in the communication of a code to a card reader. Incentives may both be displayed and communicated to a card reader such that, for example, they may be utilized both online and in-store. A code may include information representative of whether it is an online, in-store, or both online and in-store incentive such that a remote processor receiving a code can reject the promotion if the promotion is used in the environment the code was not intended for. Environments may be classified in a number of ways. For example, a particular code may be associated with purchases made using card information entered into a wireless telephonic device or a particular brand of wireless telephonic device. A card may include a source of light that may be controlled to provide light pulses such that information may be communicated to other cards or other devices (e.g., a wireless telephonic communications device).

Figure 9:
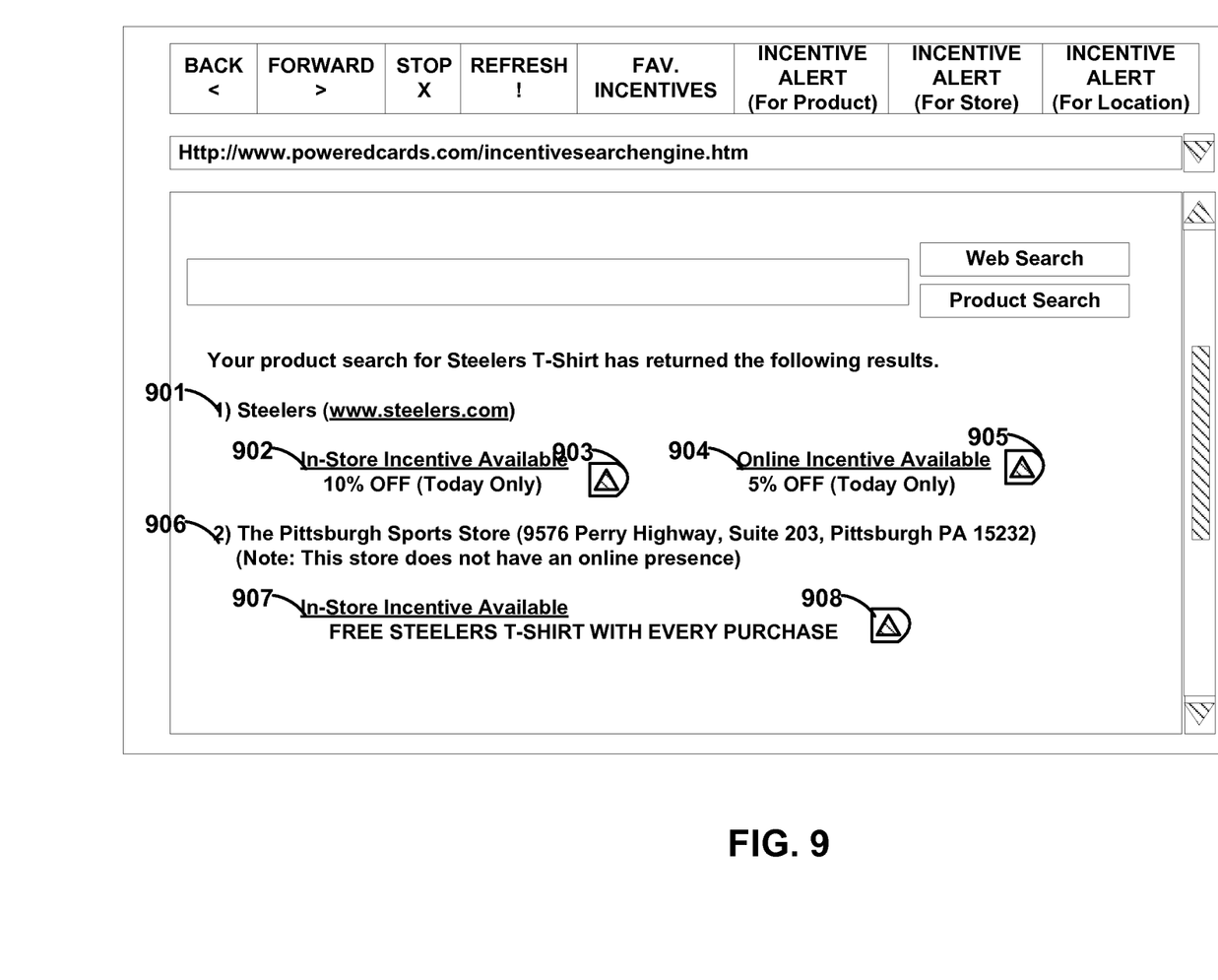
FIG. 9 is an illustration of a graphical user interface constructed in accordance with the principles of the present invention.

FIG. 9 shows a graphical user interface. GUI 900 may include search results 901 and 906, promotion indicia 902, 904, and 907, and light pulse generator indicia 903, 905, and 908. Result 901 may provide one promotion indicia 902 and light pulse generator 903 (e.g., for an in-store incentive) and another promotion indicia 904 and light pulse generator 905 (e.g., for an online incentive). Persons skilled in the art will appreciate that a search provider may be provided data regarding what promotions were used by a user. In doing so, additional information on a consumer's behavior may be established and utilized to deliver more personalized results to that user or particular fees to a particular merchant associated with the redeemed promotions. Search result 906 may be provided that includes search result indicia 907 and light pulse generator 908.

Persons skilled in the art will also appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

What is claimed is:
1. A system comprising:
a search engine operable, by a processor, to provide search results to a user in response to a search by the user, at least one of said search results including an incentive code,
a device, wherein said incentive code is enterable into said device, said device being operable to integrate said incentive code into magnetic stripe data and to communicate payment information and said incentive code as a single magnetic stripe data communication to a merchant point-of-sale terminal during a purchase transaction that enables a user of said device to redeem an in-store purchase incentive based on said incentive code, and
a matching settlement provider server that receives said communicated payment information and said incentive code from said merchant point-of-sale terminal, said matching settlement provider server providing said payment information to a card provider identified by the payment information and also providing incentive payment service shares to at least one of a merchant that processed said purchase transaction, said card provider, and a provider of said search engine, based on whether marketing data associated with the purchase is provided to any of said merchant, said card provider, said search engine provider, and said matching settlement provider.

2. The system of claim 1, wherein said device is a battery powered payment card associated with a payment number.

3. The system of claim 1, wherein said incentive code is operable to be redeemed with an online purchase.

4. The system of claim 1, wherein said incentive code is operable to be redeemed with an in-store purchase.

5. The system of claim 1, wherein said incentive code is operable to be redeemed with an online purchase and an in-store purchase.

6. The system of claim 1, wherein said search engine is operable to display merchandise and promotions from a merchant.

7. The system of claim 1, wherein said search engine is operable to display merchandise and promotions from a plurality of merchants.

8. The system of claim 1, wherein said incentive code is a code communicated to a user via a search results webpage of said search engine.

9. The system of claim 1, wherein said device is operable to receive said incentive code via light pulses communicated from a displayed website.

10. The system of claim 1, wherein said device is operable to receive said incentive code via light pulses communicated from a displayed website, and device alignment indicia is provided on said displayed website.

11. The system of claim 1, wherein said incentive code is manually enterable into said device.

12. The system of claim 1, wherein said device is a battery powered payment card including a plurality of buttons, and each button is associated with a different incentive code.

13. The system of claim 1, wherein said device is a battery powered payment card including a plurality of buttons, a plurality of displays and a plurality of light sources, each of said buttons is associated with a different incentive code, each of said displays is associated with a different one of the buttons and is operable to display a corresponding incentive code, and each of said light sources is associated with a different one of said buttons and is operable to indicate a selected incentive code.

14. The system of claim 1, wherein said device is operable to communicate said incentive code to said merchant point-of-sale terminal in a discretionary data field of track data.

15. The system of claim 1, wherein said incentive code includes secret data, and said device is operable to accept said incentive code based on said secret data.

16. The system of claim 1, wherein said device is a wireless telephonic device.

17. The system of claim 1, wherein said device is operable to receive said incentive code via at least one selected from a group consisting of cellular transmissions, optical transmissions, and audible transmissions.

* * * * *